United States Patent [19]

Etter et al.

[11] Patent Number: 4,992,214
[45] Date of Patent: Feb. 12, 1991

[54] OPTICALLY NONLINEAR AROMATIC CARBOXYLIC ACID COMPLEXES

[75] Inventors: Margaret C. Etter, St. Paul; Gayle M. Frankenbach, Minneapolis, both of Minn.

[73] Assignee: Regents of the University of Minnesota, Minneapolis, Minn.

[21] Appl. No.: 256,973

[22] Filed: Oct. 13, 1988

[51] Int. Cl.⁵ .......................... F21V 9/04; F21V 9/06
[52] U.S. Cl. .................... 252/587; 252/582; 558/411; 558/415; 558/425; 560/103; 562/405; 562/433
[58] Field of Search .................. 252/582, 589, 587; 558/411, 415, 425; 560/103; 562/405, 433

[56] References Cited

U.S. PATENT DOCUMENTS

| | | | |
|---|---|---|---|
| 3,584,230 | 6/1971 | Tein | 307/88.3 |
| 3,965,375 | 6/1976 | Bergman, Jr. et al. | 307/88.3 |
| 4,199,698 | 4/1980 | Bethea et al. | 307/425 |

OTHER PUBLICATIONS

Y. M. Issa et al., *Revue Roumaine de Chimie*, 25, 1535 (1980).
A. M. Hindawey et al., *Acta Chimica Academiae Scientiarum Hungaricae*, 92, 263 (1977).
D. J. Williams, *Angew. Chem. Int. Ed. Engl.*, 23, 690 (1984).
R. V. Vizgert et al., *Sov. J. Quantum Electron.*, 12, 214 (1982).
T. W. Panunto et al., *J. Amer. Chem. Soc.*, 109, 7786 (1987).
J. Zyss, *J. Molec. Electronics*, 1, 25 (1985).
K. A. Jackson et al., *J. Crystal Growth*, 42, 364 (1977).
D. A. Kleinman et al., *Physical Review*, 145, 338 (1966).

H. Suzuki et al., *Synthesis*, 53 (1974).
L. Leiserowitz, *Acta Cryst.*, 32, 775 (1976).
D. Semmingsen, *Acta Chem. Scand.*, 27, 3961 (1973).
A. R. P. Jagarlapudi et al., *J. Chem. Soc., Perkin Trans. II*, 1905 (1985).
M. Shiro et al., *Chem. Lett.*, 1151 (1972).
S. K. Kurtz, *Trans. Am. Crystallogr. Assoc.*, 63 (1983).
J. R. Lechat et al., *Acta Cryst.*, A40, C264 (1984).
J. R. Lechat et al., *Acta Cryst.*, B37, 1468 (1981).
Etter, M. et al., Chem. Mater., 1(1), 10–12, 1989.
The Washington Post, Sunday, Aug. 20, 1989, B3.
Issa, Y. M. et al., CA 95(19):167965s, Rev. Roum. Chim., 25(11-12), 1535–1541, 1980.
Hindawey, A. M. et al., CA 87(25):200591b, Acta Chim. Acad. Sci. Hung., 92(3), 263–70.

*Primary Examiner*—John S. Maples
*Assistant Examiner*—Richard Treanor
*Attorney, Agent, or Firm*—Merchant, Gould, Smith, Edell, Welter & Schmidt

[57] ABSTRACT

Optically nonlinear aromatic carboxylic acid cocrystals are provided of the formula:

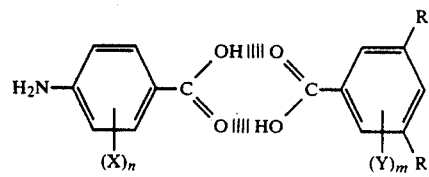

wherein each R is CN or $NO_2$, n is 1–4, m is 1–3 and X and Y are individually $(C_1-C_3)$alkyl, $(C_1-C_3)$alkanolyl, $(C_1-C_3)$alkoxycarbonyl, ar$(C_1-C_5)$alkyl, aryl, $(C_1-C_3)$alkoxy, hydroxy, halo or mixtures thereof.

10 Claims, 1 Drawing Sheet

OPTICALLY NONLINEAR AROMATIC CARBOXYLIC ACID COMPLEXES

GRANT INFORMATION

This invention was made with the support of Grant No. N00014-86-K-0660 awarded by the Office of Naval Research. The Government has certain rights in the invention.

BACKGROUND OF THE INVENTION

A nonlinear optical material is one that gives a nonlinear optical response when exposed to intense radiation. When exposed to normal light, such optical properties as the refractive indices of materials change linearly with light intensity. But when the intensity is great enough, as with laser light, these properties can vary as the square, cube or higher power of an applied electromagnetic field; or as the product of two, three or more different fields applied at once.

This is because optical properties depend on the degree of charge separation (polarization) induced by light. Total polarization of a molecule or region of a substance by an applied electromagnetic field is the sum of all the intrinsic, first-order, second-order or higher-order polarizations:

$$P = P_o + \alpha E + \beta EE + \gamma EEE + \ldots$$

where P is the total dipole moment, $P_o$ is the intrinsic dipole moment, and $\alpha$, $\beta$ and $\gamma$ are first-, second- and third-order hyperpolarizabilities.

Such changes in the overall polarization of a material by an applied field result from all of the individual contributions to the dipole moment of a molecule or region caused by the field:

$$P = P_o + \chi^{(1)}E + \chi^{(2)}EE + \chi^{(3)}EEE + \ldots$$

where p is the total polarization, $P_o$ is the intrinsic polarization, the $\chi$s are first-, second-, third- and higher-order susceptibility coefficients, and the Es are either different electromagnetic fields or photons of the same kind.

Nonlinear optical effects take their name from their origin as powers or products of electromagnetic fields. The effects themselves are interactions of photons of light with photons of the same frequency or photons of different frequencies to produce photons of combined frequency.

The various optical linear and nonlinear susceptibilities and hyperpolarizabilities are related to the corresponding nonlinear effects and to possible applications in Table I. The microscopic entity at the origin of the nonlinear behavior would be a molecule in the case of an organic molecular crystal.

TABLE I

| Order | Crystal | Molecule | Effects | Possible Utilization |
|---|---|---|---|---|
| 1 | $\chi^{(1)}$ | $\alpha$ | refraction | optical fibres |
| 2 | $\chi^{(2)}$ | $\beta$ | generation of second harmonic $\omega + \omega \to 2\omega$ | frequency doublers |
| | | | frequency mixing $\omega_1 \pm \omega_2 \to \omega_3$ | optical mixers |
| | | | parametric amplification $\omega_3 \to \omega_1 + \omega_2$ | optical parametric oscillators |
| 3 | $\chi^{(3)}$ | $\gamma$ | Pockels effects $\omega + E(O) \to \omega$ 4-wave mixing phase gratings Kerr effect | electro-optical modulators Raman coherent spectroscopy real time holography ultra high-speed optical gates |
| | | | optical bi-stability | amplifiers, amplitude choppers and logical gates |

As shown in Table I, the simplest second-order nonlinear effect is frequency doubling. Laser light enters a substance and emerges as light of double the frequency (half the wavelength). Frequency doublers could convert infrared light into visible light for easier detection of signals.

Alternatively, pumping of a substance with laser light of one frequency could cause it to lase at two different frequencies. Because the values of the two new frequencies depend on the angle at which the original beam enters the solid, adjusting the angle opens the way to tunable lasers, whose new frequencies extend their range of use.

Instead of light, one of the fields can be electrical. At one electric field and angle of incidence, the incoming light can be guided along the substance, which becomes a wave guide, in one preferred direction. Changing the frequency or angle of incidence may cause the substance to stop being a wave guide. Such behavior may lead to optical on-off switches. Other nonlinear optical effects could produce light-signal modulation or amplification.

The intensity of nonlinear optical effects decreases as the order increases. Thus, third-order effects are weaker than second-order ones. At the present time, effects of orders higher than three are too weak to be of interest for practical devices, though physicists may use them in theoretical studies. Third-order effects are useful because they are not highly dependent on ordering of molecules or regions in substances. Second-order effects are stronger, but molecules or regions must be acentric and are usually highly ordered.

Currently, the only technologically useful nonlinear optical materials are certain inorganic crystals, such as LiNbO$_3$. However, the potential of organic materials to exhibit nonlinear optical properties has been extensively investigated in recent years, and a number of polymeric and nonpolymeric organic compounds which exhibit substantial optical nonlinearities have been identified. See, D. J. Williams, *Angew. Chem. Int. Ed. Engl.*, 23, 690 (1984).

Second-order effects in organic or inorganic molecules result from enhancement of polarization in one direction and inhibition in another. For example, p-nitroaniline has a large molecular hyperpolarizability, $\beta$, due to the natural tendency for the amino group to donate electrons to the benzene pi-system and for the nitro group to accept them. The crest of a light wave passing through a molecule of para-nitroaniline may cause polarization of the molecule with the amino group donating charge and the nitro group accepting it.

When the trough of the wave passes through, the influence may be to cause charge donation by the nitro group and acceptance by the amino group, which is against the nature of these structures. Thus, the response of the molecule is unsymmetrical; it is greater in one direction than the other. Para-nitroaniline is also transparent at many wave lengths of interest, including 0.532 μm, which permits frequency doubling of the commonly used 1.064 μm wavelength from a Nd:YAG laser. However, this molecule crystallizes in a centrosymmetric phase, and the second harmonic coefficients are, because of the symmetry conditions, zero.

Therefore, apart from the requirement for molecular hyperpolarizability, an organic molecule exhibiting second-order nonlinear optical effects must crystallize into a noncentric packing pattern, so that the second harmonic ($\chi^{(2)}$) can be nonzero. A number of approaches have been taken to attain this result. The use of a chiral molecule ensures formation of a noncentrosymmetical crystal and mathematically guarantees a non-vanishing $\chi^{(2)}$, but not necessarily a large one. Another approach that is not understood, but that can work for biasing organic molecules to pack into noncentric structures, is to use polar aromatic molecules with meta-substitution patterns. For example, 2-methyl-4-nitro-aniline, as disclosed by C. G. Bethea et al. in U.S. Pat. No. 4,199,698, has a nonlinear coefficient ($d_{12}$) which is 5.8 times larger than the nonlinear coefficient ($d_{31}$) of LiNbO$_3$. It has also been reported that it is sometimes possible to obtain noncentrosymmetric crystals by cocrystallizing two similar compounds. For example, mixed crystals of para-nitroaniline and para-nitrophenol which exhibit SHG have been obtained by cocrystallization from solutions. See, *Sov. J. Quantum Electron.*, 12, 214 (1982). Commonly-assigned U.S. Pat. No. 4,839,536, issued June 13, 1989 disclosed certain optically nonlinear cocrystals comprising complexes of pyridine-N-oxides, such as 4-nitropyridine-N-oxide, with aromatic electron-donating compounds such as 3-aminophenol and 4-aminobenzoic acid. See also, T. W. Panunto et al., *J. Amer. Chem. Soc.*, 109, 7786 (1987).

If a polarizable molecule which is transparent at the desirable wavelength packs in a noncentric crystal structure, then it will yield a useful nonlinear response when two additional criteria are met. First, the crystal must be phase matchable, in that there must be a propagation direction in the crystal where the incoming light and the second harmonic waves have coherent phases. Secondly, the molecular dipole moment vector should be aligned along or near to a particular direction of the crystal, with the exact direction being determined by the space group symmetry of the crystal. Since there is no method presently available to control either of these factors, the preparation of new organic crystals which exhibit nonlinear optical properties such as second harmonic generation remains a largely empirical art.

Therefore, although considerable progress has been made, both in understanding the electronic origins of molecular nonlinearities in organic π systems, as well as in the hindsight explanation of the quantitative relationship of the molecular arrangements in a crystal to the observed nonlinearities, a need exists for new compounds having optimized nonlinear optical properties.

SUMMARY OF THE INVENTION

The present invention is directed to certain organic complexes which can exhibit intense second harmonic generation (SHG), to a method of generating nonlinear optical effects using said complexes, and to nonlinear optical devices, such as frequency doublers which incorporate crystalline bodies consisting essentially of these organic complexes. The present complexes are crystalline compounds of the formula (I):

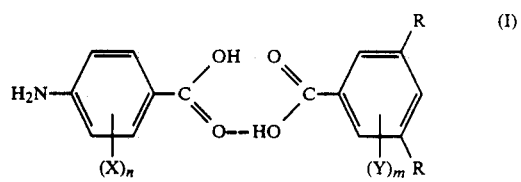

wherein each R is CN or NO$_2$, n is 1–4, m is 1–3, and X and Y are individually (C$_1$–C$_3$)alkyl, (C$_1$–C$_3$)alkanoyl, (C$_1$–C$_3$)alkoxycarbonyl, aryl, ar(C$_1$–C$_5$)alkyl, (C$_1$–C$_3$)alkoxy, hydroxy, H, halo (F, Cl, Br, I) or mixtures thereof. Preferably, n and m are 1–2, most preferably x is H and m is 1–2. The group Y is preferably methyl, halo, most preferably Cl, or hydroxy. Most preferably, x is 1 and Y is 2- or 4-chloro; 2- or 4-hydroxy, 2- or 4-methyl, or H. Each R group is NO$_2$ or CN, and preferably both are either NO$_2$ or CN, preferably NO$_2$. The aryl or aralkyl group is preferably phenyl, tolyl, benzyl, xylyl, anisyl, 2-phenylethyl and the like, e.g., the phenyl group is preferably substituted with a (C$_1$–C$_3$)alkyl group or a (C$_1$–C$_3$)alkoxy group.

The present invention is also directed to a nonlinear optical device, comprising, in combination, a harmonic generating medium, means for introducing coherent radiation into said harmonic-generating medium, and means for utilizing the coherent radiation emitted from said medium, wherein said medium consists essentially of a crystalline body of a compound of the formula I:

Preferably, the present device is employed to convert coherent optical radiation including a first frequency into coherent optical radiation including a second frequency, and this method of generating a nonlinear optical response using the present compounds is also within the scope of the invention. Thus, the present invention also provides a method of generating a nonlinear optical response comprising introducing coherent radiation at a first frequency into a crystalline body of a compound of formula I so that the radiation is converted into coherent radiation including a second frequency. For example, preferred compounds of the invention can act as second harmonic generating media which double the frequency of the incident beam of coherent energy produced by a laser. The emitted beam of coherent energy, e.g., of light, has a frequency which is twice that of the introduced beam.

Therefore, other contemplated uses of the present compounds, which are within the scope of the invention include those listed on Table I, hereinabove. Therefore, the present compounds can be used in optical mixers, optical parametric oscillators and electrooptical modulators. The laser may be a Nd:YAG or a GaAs laser emitting optical radiation having a wavelength of about 1.0 and 0.8 μm, respectively. The means for utilizing the emitted energy may be a photodetector or an optical fiber. The means for introducing and for utilizing may also be prism couplers that introduce light from a laser into the harmonic-generating medium and extract light from the medium and direct it to a photodetector, optical fiber or other device. Preferred wavelengths for use in the present nonlinear optical devices using the present compounds as the harmonic generating media are between about 0.5 μm and 2.0 μm. The term "optical," as used herein, means wavelengths between visible and the near infrared.

As used herein, the term "crystalline body" is intended to encompass the use of both single crystals and a plurality of crystals, e.g., a powder consisting essentially of at least one of the recited compounds.

As used herein, the term "crystalline" indicates that a sample of a compound, whether a single crystal or a polycrystalline powder (homogeneous or heterogeneous), gives an x-ray diffraction pattern.

DETAILED DESCRIPTION OF THE INVENTION

Figure 1:
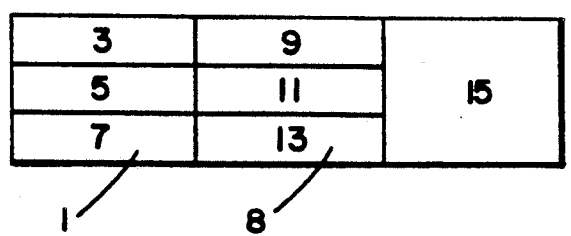
FIG. 1 is a schematic representation of a representative nonlinear device using bodies of the crystalline compounds of the invention as the active element.

FIG. 1 is a schematic representation of a representative nonlinear device using a harmonic-generating medium consisting essentially of a crystalline body of a compound of the invention as the active element. Element 1 represents means for introducing coherent optical radiation into the harmonic-generating medium 8. Element 1 may be a solid state laser, a prism or an optically polished surface. Medium 8 can convert the incident coherent radiation including a first frequency into emitted coherent radiation including a second frequency. It is contemplated that for some device applications, either or both the incident and emitted radiation may have components at more than one frequency. For example, there may be three frequencies of coherent radiation with the phase-matching condition $\omega_3 n_3 = \omega_1 n_1 + \omega_2 n_2$, the energy conservation condition $\omega_3 = \omega_1 + \omega_2$ being satisfied. $\omega$ is the frequency, n is the refractive index and the subscripts 1, 2 and 3 refer to the lowest, middle and highest frequency, respectively. There may be two incident and one emitted wave or one incident and two emitted waves. Means for utilizing the coherent radiation 15 may be an optically transparent medium such as an optical fiber, a photodetector means, such as a prism, for extracting light from the active element, or an optically polished surface. If a prism is used, the light may be directed to further utilization means.

In the embodiment depicted, element 1 is a solid state laser having AlGaAs layer 3, GaAs layer 5 and AlGaAs layer 7. Other solid state lasers, such as Nd:YAG, can be used depending upon the wavelength of coherent radiation desired. Layer 5 is the active layer and the source of coherent optical radiation. Glass layers 9 and 13 are on the top and bottom, respectively, of layer 11 which is the active element of the medium and consists essentially of a crystalline body of a compound of the invention. The thickness of layer 11 is chosen to insure that the phase-matching condition is satisfied. The thickness of the layer will depend on the wavelengths of the coherent radiation and the refractive indices of layers 9 and 13.

For some purposes, prism coupling will be preferred to the edge-coupling embodiment depicted. A thin film configuration using prism coupling is described in U.S. Pat. No. 3,584,230, the disclosure of which is incorporated by reference herein. Two useful configurations of linear waveguides are disclosed in J. Zyss, J. Molec. Electronics, 1, 25, 33-40 (1985) at FIG. 4, the disclosure of which is incorporated by reference herein. A waveguide configuration may be obtained by growing a thin, approximately 1.0 μm, single crystal of a compound of the invention, using a liquid phase epitaxial growth method, such as the method disclosed in J. Crystal Growth, 42, 364-369 (1977).

Other embodiments of the nonlinear device using MNA are contemplated. For example, the devices might also be constructed with active element 8 consisting of bulk MNA crystals and phase-matched in well-known manner such as described in Physical Review, 145, 338-379 (1966) and in U.S. Pat. No. 3,965,375. Contemplated device applications are similar to those described for waveguide form devices.

SYNTHETIC METHODOLOGY

The compounds of the present invention can be referred to as "mixed crystals" or "cocrystals" of the type X/Y, where X is a substituted or unsubstituted 4-aminobenzoic acid and Y is a benzoic acid which is at least 3,5-disubstituted with electron-withdrawing groups such as nitro and/or cyano. It is believed that intermolecular hydrogen bonding between the two $CO_2H$ groups, indicated by C=O . . . HO—C in formula I, as well as between the amino group and the CN and/or $NO_2$ groups assists in organizing the mixed crystal into the necessary acentric crystal structure.

The present compounds can be prepared either as single cocrystals from solution or can be obtained by mixing substantially equimolar amounts of the individual components of the cocrystal together under conditions of moderate pressure, as by grinding the components together in a mortar and pestle, optionally followed by moderate heating of the mixture. The preparation of single cocrystals from solution follows either known literature procedures or laboratory techniques which are commonly employed to grow crystals. One such technique employs the evaporation of solutions of approximately equimolar amounts of the individual components ("X" and "Y"), which have been preformed in a suitable organic solvent, such as methanol, toluene, acetonitrile, acetone or mixtures thereof.

The individual aromatic carboxylic acids used to prepare compounds of the present invention are either commercially available, or can be prepared from commercially available materials by methods well known to the art of organic synthetic chemistry. For example, 4-aminobenzoic acid, 4-amino-2-chlorobenzoic acid, 3,5-dinitrobenzoic acid, 3,5-dinitro-4-methylbenzoic acid and 3,5-dinitro-2-methylbenzoic acid are available from Aldrich Chemical Company, Milwaukee, Wis. The compounds 3,5-dinitro-2-hydroxybenzoic acid, 3,5-dinitro-4-chlorobenzoic acid, 3,5-dinitro-4-hydroxybenzoic acid and 3,5-dinitro-2-chlorobenzoic acid are available from Pfaltz and Bauer, Stamford, Conn.

The preparation of 2,4,6-triiodo-3,5-dicyanobenzoic acid is disclosed in Ger. Offen. 3,001,294. This material can be used to prepare various substituted 3,5-dicyanobenzoic acids by the reduction of one or more of the iodo moieties, or by the conversion of one or more iodo moieties to other functional groups. The compound 3,5-diiodosalicylic acid is commercially available from Aldrich Chemical Co. and can be converted to 3,5-dicyanosalicylic acid by the procedure of H. Suzuki et al., Synthesis, 53 (1974). The compound of 3,5-diaminobenzoic acid can be converted to 3,5-dicyanobenzoic acid via the Sandmeyer reaction. See Org. Prep. and Procedures, 1, 221 (1969). Many methods are known for the conversion of arylhalides (ArX) to hydride or to other functional groups: *J. Amer. Chem. Soc.*, 51, 1483 (1929)(ArX→ArAlkyl); *J. Chem. Soc.*, 711 (1950)(ArX→ArAr); *J. Chem. Soc., C,* 2600 (1969); *Ber.*, 91, 1376 (1958)(ArX→ArH); *J. Amer. Chem. Soc.*, 77, 6032 (1955)(ArX→ArOH); and *J. Org. Chem.*, 24, 504 (1959) (ArX→ArCO$_2$H). Other methods are given in I. T. Harrison et al., eds., *Compendium of Organic Synthetic Methods,* Wiley-Interscience, NY (1971). The disclosure of these documents is incorporated by reference herein. The invention will be further described by reference to the following detailed example.

EXAMPLE I

Analysis of Second Harmonic Generation (SHG) of Bis(carboxylic acid) Cocrystals

A. Materials and Methods

The crystalline compounds of the present invention are analyzed for SHG after reduction to powders of particle sizes of about 25–100μ, employing urea as the SHG intensity standard. An about 5.0 mg sample of a single cocrystal is reduced to a particle size of about 25–100μ. The resultant powder is placed on a clean, scratch-free microscope slide and a small drop of Fluorolube (Spectra-Tech, Stamford, Conn.) (about 0.05 ml) is added to form a dispersion with the powder. A microscope cover slip is placed onto the sample and depressed to produce a circle of sample about 3 mm in diameter. The microscope slide is placed in the beam of a Kigre MK-20 Q-switched Nd:YAG laser ($\lambda$=1064 nm) which has been passed through a 10% transmitting neutral density filter, approximately 5.5 cm from the exit port. Second harmonic generation ($\lambda$=532 nm) is separated from the fundamental frequency by a Melles Griot 03BTF023 harmonic beam splitter and passed through a focusing lens into a BG-18 schott glass filter followed by a RCA 1P28A photomultiplier. The photomultiplier converts the SHG into an electrical signal that is displayed on a HP 54200A digitizing oscilloscope. The size of the peak is not simply related to the intensity of the SHG but the intensity relative to urea can be reported by comparing the peak size produced by the sample to the size of the urea peak.

Using this methodology, four representative starting materials: 4-aminobenzoic acid, 3,5-dinitrobenzoic acid, 4-chloro-3,5-dinitrobenzoic acid and 3,5-dinitrosalicylic acid, did not exhibit a second harmonic signal relative to urea.

B. 4-Aminobenzoic Acid/3,5-Dinitrobenzoic Acid (I)

The cocrystal 4-aminobenzoic acid/3,5-dinitrobenzoic acid (I) was made by heating equimolar amounts of the two starting reagents, total weight 0.25 g, in 50 ml of methanol and heating until the starting reagents dissolved. Cocrystals were grown by slow evaporation of the solution at 10° C. The crystals of I, which are brilliant, yellow, and shaped like rectangular blocks or pyramidal chunks, are approximately 2 mm×3 mm×5 mm. The melting point of a single crystal is 204.5°–206.0° C.

A crystal of I having the pyramidal habit is mounted along its long axis for x-ray analysis. Data is collected in an automated four-circle diffractometer with T=24° C., Lattice Parameters are obtained from least-squares analysis of 25 reflections $-11° < \theta < 16°$ on an Enraf-Nonius CAD-4 diffractometer, graphite monochromated Mo K$_\alpha$ radiation; space group by absences, $\omega-2\theta$ scan, h=25 to 25, k=−8 to 8, l=−24 to 24. The complete sphere of data, 5204 reflections, for $0° < \theta < 25°$ was collected. These were arranged assuming space group Fdd2 to give 1309 independent reflections with R$_{int}$=0.025. The Friedel pairs were then averaged to give 715 independent reflections with R$_{int}$=0.012. This indicates, as expected with Mo radiation, that the Friedel pairs did not differ significantly in measured intensity. All calculations were made with the 618 reflections for which I>1$\sigma$(I). No empirical absorption corrections were applied. The change in intensity was 0%, over 58.4 hours, for three check reflections. The crystal of I had an absorption coefficient of $\mu$(Mo)=1.17 cm$^{-1}$.

The x-ray analysis of I provided the following information, a=21.49(3), b=7.041(7), c=20.65(2) Å, V=3120.1(1) Å$^3$, space group=Fdd2, Z=8, d$_c$=1.48 g·cm$^{-3}$, F(000)=1440, R$_w$=0.032, R$_f$=0.029 for 1309 unique reflections. The cocrystal is held together in sheets by a system of hydrogen bonding between the two carboxylic acids and between nitro and amino groups. The carboxylic acids hydrogen bond as a heterodimer with the following geometry O1A . . . O1B=2.62(1), O1A-H0A=1.006(6), O1B-H0B=1.000(6), H0A . . . O1B=1.617(6), H0B . . . O1A=1.624(6) Å, O1A-H . . . O1B=174.2(5)°. An amino hydrogen from one heterodimer is positioned between the oxygens of a nitro group on a symmetry related heterodimer with N1A . . . O2B=3.227(3), N1A . . . O3B=3.33013(3), H(N) . . . O2B=2.43(1), H(N) . . . O3B=2.58(1), N1A-H=0.95(1) Å, N1A-H . . . O2B=141.5(5)°, N1A-H . . . O3B=132.73(5)°; the heterodimer is bisected by the crystallographic two-fold axis making the two amino hydrogens equivalent. The benzoic acid dimer makes a near zero dihedral angle with both aromatic rings.

The Fluorolube mull was prepared for infrared (IR) analysis, which was executed on a Nicolet FTIR. The following strong peaks are present in the spectrum: 3495 cm$^{-1}$(s), 3394(s), 1690(m), 1636(multiple peaks), 1599(s) and 1541(s). A solution NMR sample was prepared using d$_6$-acetone. The sample was run on a 200 MHz automatic IBM FT-NMR: 6.70 (1.0 H, d, -phenyl CH), 7.70 (1.0 H, d, -phenyl CH), 9.10 (1.5 H, m-phenyl CH). Second harmonic analysis of I was done using the procedure described hereinabove, yielding a signal 1.8 times more intense than that of pure urea.

A sample of I was made using a solid-state complexation technique. The two starting reagents were ground together in approximately equal amounts for 10 seconds in a WIG-L-BUG automatic grinder. When 4-aminobenzoic acid (white) was ground with 3,5-dinitrobenzoic acid (off-white), the product became bright yellow. The following data were gathered three days after the starting reagents were ground together. When the melting point was taken, the sample changed from bright yellow to bright orange at 177.0°–179.0° C. and melted at 197.0°–199.5° C. This melting point is slightly broader and lower by comparison with the melting point for the crystal of compound I grown in solution. A Fluorolube mull was made and FTIR analysis revealed —NH stretching peaks were present for both the complexed (3495 and 3394 cm$^-$) and noncomplexed 4-aminobenzoic acid (3461 and 3364 cm$^{-1}$). Two weeks after the reagents were ground together, about 50% complexation had occurred, as estimated by differential scanning calorimetry (DSC). This material gives a SHG signal of two times that of pure urea.

C. 4-Aminobenzoic Acid/4-Chloro-3,5-Dinitrobenzoic Acid (III)

A crystalline complex of 4-aminobenzoic acid and 4-chloro-3,5-dinitrobenzoic acid was prepared using the solid-state method in Example I.

The following data was collected three days after the starting reagents were ground together. When the melting point of II was taken, the complex began to turn orange at 158.0° C. and continued to do so until it had completely changed color around 200° C. The compound II decomposes above 290.0° C. The intensity of second harmonic generation from II was 0.58 times that of urea. A Fluorolube mull was prepared and FTIR analysis revealed that —NH stretching peaks were evident for both the complexed (3490 and 3391 cm$^{-1}$) and noncomplexed (3461 and 3364 cm$^{-1}$)4-aminobenzoic acid. The peaks for the noncomplexed 4-aminobenzoic acid disappeared after several days, indicating the complex had reached completion. At this point, the intensity of the SHG was 1.8 times that of pure urea. If this cocrystal is heated above 160° C., it will undergo a solid-state reaction to form 4',4-dicarboxy-3,5-dinitrobiphenylamine.

D. 4-Aminobenzoic Acid/3,5-Dinitrosalicylic Acid (III)

A crystalline complex of 4-aminobenzoic acid and 3,5-dinitrosalicylic acid was prepared using the solid-state method of Example I.

The following data was collected three days after the starting reagents were ground together. When melting point was taken of III, the sample turned orange between 179.0°–180.0° C. and melted at 192.5°–197.0° C. The intensity of second harmonic generation from III is equal to that of urea. A Fluorolube mull of III was prepared and FTIR analysis revealed that —NH stretching peaks for both the complexed (3495 and 3395 cm$^{-1}$) and the noncomplexed (3461 and 3364 cm$^{-1}$) 4-aminobenzoic acid are present. After several days, the peaks for the noncomplexed 4-aminobenzoic acid disappeared, indicating that more than 50% complexation has occurred. At this point, the intensity of the SHG was 2.0 times that of pure urea.

The physical properties of the complexes (I-III) and of the four starting materials are summarized on Tables II and III, below. The cocrystals I-III exemplify novel compounds which be expected to be useful in nonlinear optical devices such as those discussed hereinabove.

TABLE II

Physical Properties of the Complexes

| Complex | Complex Color | Compound MP(°C.) | Complex SHG (× Urea) |
|---|---|---|---|
| 4-Aminobenzoic acid/ 3,5-dinitrobenzoic acid (I). | bright yellow | 204.5–206.0 | 1.8–2.1 |
| 4-Aminobenzoic acid/ 4-chloro-3,5-dinitrobenzoic acid (II). | bright yellow | decomposes >290.0 | 1.8 |
| 4-Aminobenzoic acid/ 3,5-dinitrosalicylic acid (III). | bright yellow | 192.5–197.0 | 2.0 |

TABLE III

Properties of Starting Materials

| Compound | Compound Color | Compound MP °C. |
|---|---|---|
| 4-Aminobenzoic acid | white | 188.0–189.0 |
| 3,5-Dinitrobenzoic acid | pale yellow | 204.0–206.0 |
| 4-Chloro-3,5-dinitrobenzoic acid | pale yellow | 159.0–162.0 |
| 3,5-Dinitrosalicylic acid | pale yellow | 170.0–173.0 |

The invention has been described with reference to various specific and preferred embodiments and techniques. However, it should be understood that many variations and modifications may be made while remaining within the spirit and scope of the invention.

What is claimed is:

1. A crystalline complex of the formula:

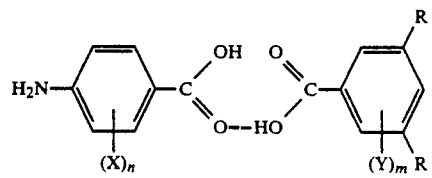

wherein each R is CN or NO$_2$, n is 1–4, m is 1–3, each X is individually (C$_1$–C$_3$)alkyl, (C$_1$–C$_3$)alkanoyl, (C$_1$–C$_3$)alkoxycarbonyl, aryl, ar(C–C$_5$)alkyl, (C$_1$–C$_3$)alkoxy, hydroxy, halo or H, each Y is individually (C$_1$–C$_3$)alkyl, (C$_1$–C$_3$)alkanoyl, (C$_1$–C$_3$)alkoxycarbonyl aryl, ar(C$_1$–C$_5$)alkyl, (C$_1$–C$_3$)alkoxy, 4-hydroxy or halo, and —C—OH----O═C— represents an intermolecular hydrogen bond; wherein said complex generates a nonlinear optical response.

2. The crystalline complex of claim 1 wherein R is NO$_2$.

3. The crystalline complex of claim 1 wherein R is CN.

4. The crystalline complex of claim 1 wherein X is H and Y is halo.

5. The crystalline complex of claim 1 wherein X is H and Y is 4-hydroxy.

6. The crystalline complex of claim 1 wherein X is H and Y is methyl.

7. A crystalline complex of the formula:

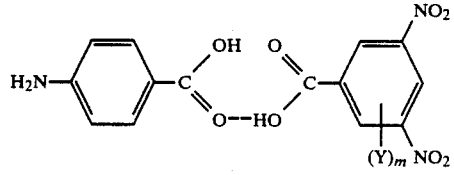

wherein m is 1 or 2 and Y is methyl, chloro or 4-hydroxy and —C—OH----O═C— represents an intermolecular hydrogen bond; wherein said complex generates a nonlinear optical response.

8. The crystalline complex of claim 7 wherein m is 1 and Y is 2-chloro or 4-chloro.

9. The crystalline complex of claim 7 wherein m is 1 and Y is 4-hydroxy.

10. The crystalline of claim 7 wherein m is 1 and Y is 2-methyl or 4-methyl.

* * * * *

UNITED STATES PATENT AND TRADEMARK OFFICE
CERTIFICATE OF CORRECTION

PATENT NO. : 4,992,214
DATED : February 12, 1991
INVENTOR(S) : Etter et al.

It is certified that error appears in the above-identified patent and that said Letters Patent is hereby corrected as shown below:

At the front page in the ABSTRACT, for " 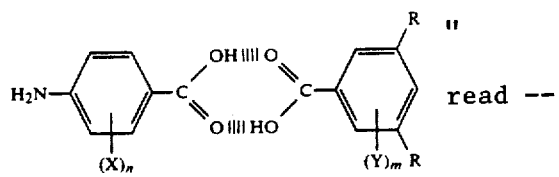 " read -- 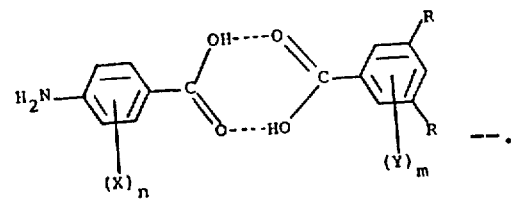 --.

In column 4, lines 6-14, for " 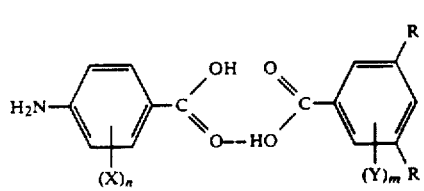 " read -- 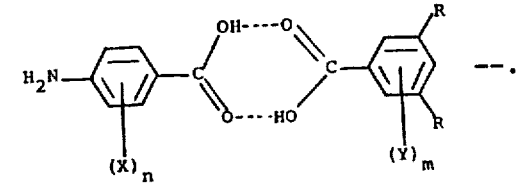 --.

In column 4, line 22, for "x is 1" should read -- m is 1 --.

In column 7, line 68, for "$0° < -\theta < 25°$" read -- $0 < \theta < 25°$ --.

In column 8, line 15, for "V=31201(1) Å$^3$" read -- V=3120(1) Å$^3$ --.

In column 8, line 29, for "03B=3.33013(3)" read -- 03B=3.330(3) --.

In column 8, line 63, for "(3495 and 3394 cm$^-$)" read -- (3495 and 3394 cm$^{-1}$) --.

In column 9, line 2, for "Acid (III)" read -- Acid (II) --.

UNITED STATES PATENT AND TRADEMARK OFFICE
CERTIFICATE OF CORRECTION

PATENT NO. : 4,992,214

DATED : February 12, 1991

INVENTOR(S) : Etter et al.

It is certified that error appears in the above-identified patent and that said Letters Patent is hereby corrected as shown below:

In claim 1, at column 10, lines 19-37, for " 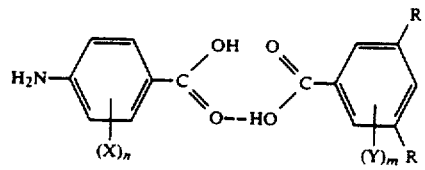 " read -- 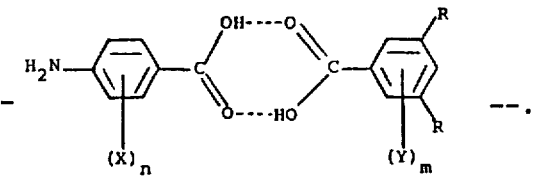 --.

In claim 1, column 10, line 30, for "ar(C-C$_5$)alkyl" read --ar(C$_1$-C$_5$)alkyl.

In claim 1, column 10, line 32, after "alkoxycarbonyl" insert --,--.

In claim 7, at column 10, lines 48-56, for " 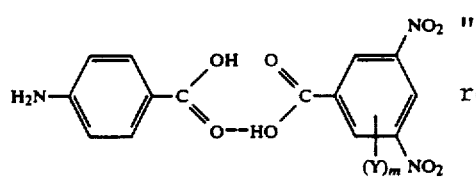 " read -- 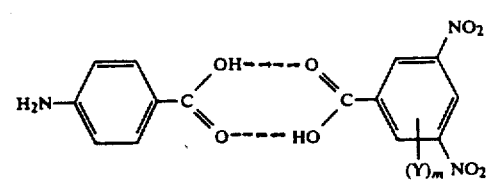 --.

In claim 7, at column 10, line 57, for "m is 1 or 2" read --m is 1-2--.

UNITED STATES PATENT AND TRADEMARK OFFICE
CERTIFICATE OF CORRECTION

PATENT NO. : 4,992,214
DATED : February 12, 1991
INVENTOR(S) : Etter, et al.

It is certified that error appears in the above-identified patent and that said Letters Patent is hereby corrected as shown below:

Claim 7, column 10, line 57, for "m is 1 or 2" read --m is 1-2--

Signed and Sealed this

Tenth Day of November, 1992

Attest:

DOUGLAS B. COMER

Attesting Officer

Acting Commissioner of Patents and Trademarks